United States Patent
Bergman et al.

(10) Patent No.: US 8,739,146 B2
(45) Date of Patent: May 27, 2014

(54) SYSTEMS AND METHODS FOR GENERATING AND DISTRIBUTING EXECUTABLE PROCEDURES FOR TECHNICAL DESK-SIDE SUPPORT

(75) Inventors: Lawrence Bergman, Mount Kisco, NY (US); Vittorio Castelli, Croton-on-Hudson, NY (US); Tessa Lau, New York, NY (US); Daniel Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1970 days.

(21) Appl. No.: 10/630,959

(22) Filed: Jul. 30, 2003

(65) Prior Publication Data

US 2005/0028144 A1 Feb. 3, 2005

(51) Int. Cl.
*G06F 9/45* (2006.01)
*G06F 9/44* (2006.01)
*G05B 11/01* (2006.01)

(52) U.S. Cl.
USPC .............. 717/159; 717/106; 717/151; 700/18

(58) Field of Classification Search
USPC .................... 717/107; 712/1; 706/60
See application file for complete search history.

(56) References Cited

U.S. PATENT DOCUMENTS

| | | | | |
|---|---|---|---|---|
| 6,134,644 | A * | 10/2000 | Mayuzumi et al. | 712/1 |
| 6,260,035 | B1 * | 7/2001 | Horvitz et al. | 706/60 |
| 6,384,843 | B1 * | 5/2002 | Harel | 715/762 |
| 6,615,240 | B1 * | 9/2003 | Sullivan et al. | 709/205 |
| 7,000,187 | B2 * | 2/2006 | Messinger et al. | 715/705 |
| 7,505,817 | B2 * | 3/2009 | McDaniel et al. | 700/18 |
| 7,559,057 | B2 * | 7/2009 | Castelli et al. | 717/159 |
| 7,603,440 | B1 * | 10/2009 | Grabowski et al. | 709/220 |
| 8,250,554 | B2 * | 8/2012 | Bergman et al. | 717/159 |
| 2004/0130572 | A1 * | 7/2004 | Bala | 345/762 |
| 2005/0125782 | A1 * | 6/2005 | Castelli et al. | 717/151 |
| 2010/0050152 | A1 * | 2/2010 | Gilboa | 717/106 |

OTHER PUBLICATIONS

Lau et al., Learning programs from traces using version space algebra, Oct. 2003, 8 pages.*
Gama et al., Machine Learning ECML 2005, Oct. 2005, 784 pages.*
International Search Report.

* cited by examiner

*Primary Examiner* — Thuy Dao
(74) *Attorney, Agent, or Firm* — F. Chau & Associates, LLC; Daniel P. Morris, Esq.

(57) ABSTRACT

Systems and methods for dynamically generating computer executable technical support procedures, as well as updating/augmenting such executable procedures, by tracking and processing sequences of actions (execution traces) that are taken by experts (or users) when performing a procedure or when executing an executable procedure.

14 Claims, 4 Drawing Sheets

SYSTEMS AND METHODS FOR GENERATING AND DISTRIBUTING EXECUTABLE PROCEDURES FOR TECHNICAL DESK-SIDE SUPPORT

TECHNICAL FIELD

The invention generally relates to systems and methods for generating and disseminating computer-executable procedures for providing technical support. More specifically, the invention relates to systems and methods for dynamically generating computer executable technical support procedures, as well as updating/augmenting such executable procedures, by tracking and processing sequences of actions (execution traces) that are taken by experts (or users) when performing a procedure or when executing an executable procedure.

BACKGROUND

Currently, technical support is provided either in-person or remotely, whereby individual problems are addressed by technical support staff. When the same problems or similar problems are encountered, the same solution procedures or similar solution procedures are repeatedly executed to solve such problems.

When a procedure needs to be executed on a large number of machines, e.g., to upgrade portions of the operating system on all machines belonging to an organization, it is customary to script the procedure (i.e., build a program in an appropriate high-level language that executes the procedure). The process of building such scripts, however, is extremely expensive in terms of costs associated with design, development and testing, although the costs associated with design and development time are usually negligible as compared to the costs associated with test time.

In contrast to regular end-user applications that are easily portable across different versions of the same operating system and across different configurations of the same operating system, maintenance and upgrade procedures often modify inner layers or parameters of the operating systems. Therefore, maintenance and upgrade procedures must be tested on a wide variety of operating system versions and configurations. This requires a substantial time investment as well as a large, well-equipped testing facility.

Due to the costs associated with scripting procedures, other methods may be used for enabling maintenance or upgrades. For instance, one method is to produce a document having instructions that guide a user through the necessary maintenance and upgrade steps. However, much like general software documentation, these instructions are often difficult to follow. For example, the instructions may read "if you have version XX of the operating system, go to step 5, otherwise go to step 3. To determine which version of the operating system your machine is running go to step 13." This instruction can be confusing even for an expert user, and does not cover all possible situations. Therefore, the alternate solution using instructive documents has a hidden cost in that users for whom the documentation is too difficult or incomplete to understand are forced to call a support center and must be assisted on an individual basis.

Other disadvantages associated with conventional methods that use scripted procedures or documentation is that such methods suffer from obsolescence. For example, as newer versions of operating systems, applications, and hardware components become available, scripted procedures must be updated to accommodate the newer versions and such updates are often very costly. Similarly, instructive documentation must be appropriately revised by adding new sections and such revisions only render such documents more confusing for end-users.

A need therefore exists for improved systems and methods for generating and disseminating technical support procedures that enable maintenance and upgrades of various systems, which overcome the problems associated with conventional methods.

SUMMARY OF THE INVENTION

The present invention is directed to systems and methods for generating and disseminating computer-executable procedures for providing technical support. More specifically, the invention is directed to systems and methods for dynamically generating computer executable technical support procedures, as well as updating/augmenting such executable procedures, by tracking and processing sequences of actions (execution traces) that are taken by experts (or users) when performing a procedure or when executing an executable procedure.

In one embodiment of the invention, a method for generating a reusable executable procedure comprises obtaining a plurality of execution traces, wherein each execution trace represents an execution instance of a procedure, and then processing the execution traces to create a reusable executable procedure that is associated with the procedure.

Preferably, an execution trace is obtained by monitoring and recording a sequence of actions that are performed by an individual (e.g., expert) when executing an instance of the procedure. Further, one or more executed actions can be annotate to describe such actions.

In another embodiment of the invention, the execution traces are processed by aligning the execution traces to identify corresponding steps between the execution traces, and then generalizing the aligned execution traces to generate the reusable executable procedure. A generalization process according to the invention comprises generalizing branches of procedures, generalizing iterations of procedures, generalizing recovery from failure of procedures, or generalizing variables of procedures, for example.

Preferably, reusable executable procedures are stored in a library of reusable executable procedures for distribution to a plurality of users. The reusable executable procedures can be executed in a client device (e.g., personal computer) for diagnosing hardware or software or upgrading software, for example.

During execution of an executable procedure, at the user's option, or due to circumstances in which one or more steps of an executable procedure cannot be successfully executed, the user can control the procedure execution by manually performing one or more steps of the executable procedure. An execution trace representing the user's actions, for example, when manually performing such steps can then be processed to augment the reusable executable procedure.

More specifically, in another embodiment of the invention, a method for executing a reusable procedure comprises launching a reusable executable procedure, automatically executing procedure steps associated with the reusable executable procedure, and relinquishing control of execution of the reusable procedure to a user, when a next step of the reusable executable procedure cannot be successfully executed. In yet another embodiment, the method comprises monitoring user actions while the user is executing steps of the reusable executable procedure, aligning the monitored user actions to the reusable procedure, and continuing automatic execution of the reusable procedure, if the monitored steps align with the reusable procedure. The monitored user actions can be used to augment the reusable executable procedure.

These and other embodiments, aspects, features and advantages of the present invention will be described or become apparent from the following detailed description of preferred embodiments, which is to be read in connection with the accompanying drawings.

DETAILED DESCRIPTION OF PREFERRED EMBODIMENTS

The present invention is directed to systems and methods for dynamically generating computer executable technical support procedures, as well as updating/augmenting such executable procedures, by tracking and processing sequences of actions (execution traces) that are taken by experts (or users) when performing a procedure or when executing an executable procedure.

It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., hard disk, magnetic floppy disk, RAM, CD ROM, DVD, ROM and flash memory), and executable by any device or machine comprising suitable architecture.

It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
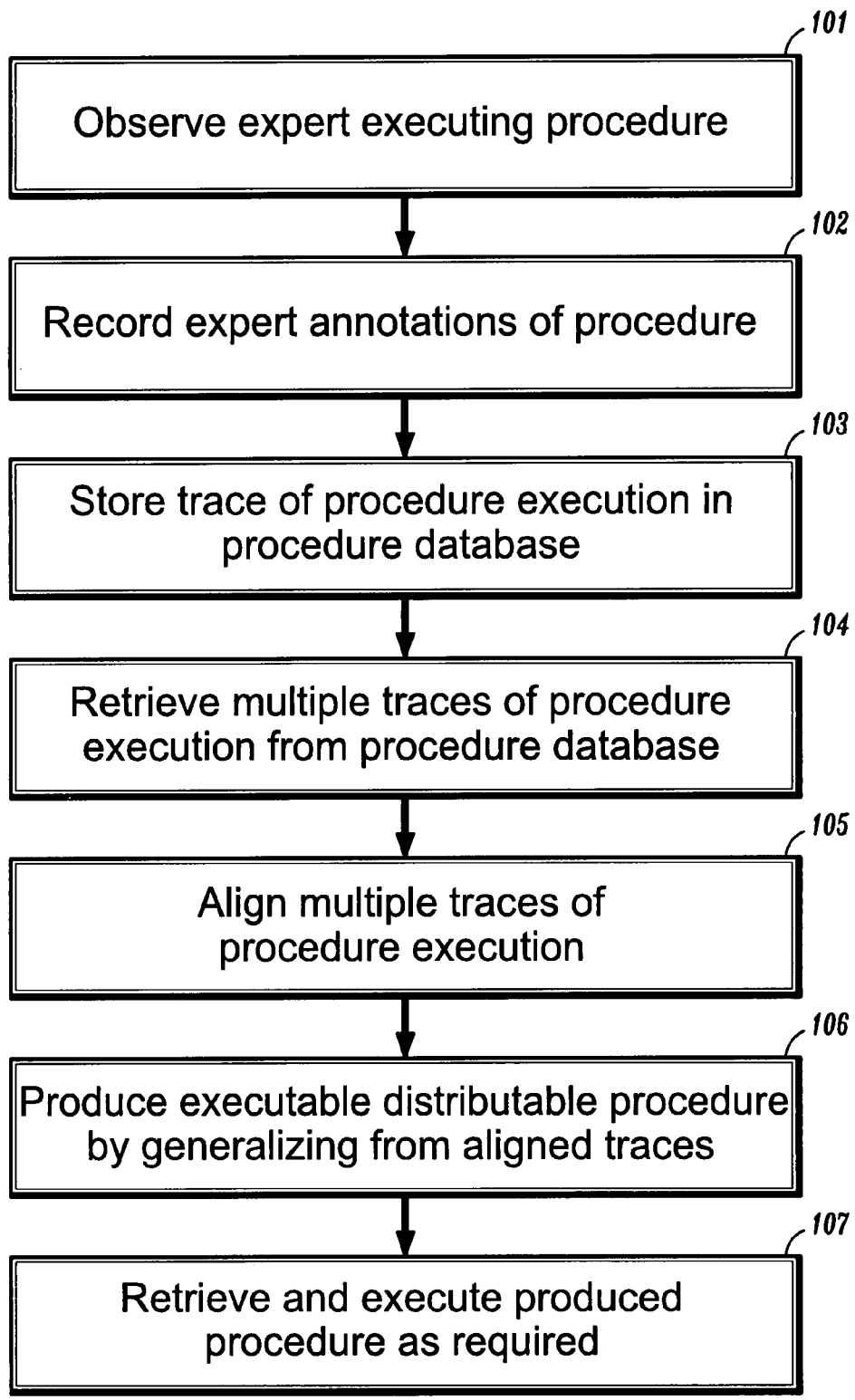
FIG. 1 illustrates a method for generating and distributing executable procedures according to an embodiment of the present invention.

Referring now to FIG. 1, a flow diagram illustrates a method for generating and distributing a reusable executable procedure according to an embodiment of the invention. Initially, an expert executing a given procedure or task is "observed" (step 101). More specifically, the process of observing comprises monitoring and recording a sequence of steps/actions (e.g., mouse clicks, keyboard actions, etc.) that are taken by an expert (or user) when manually performing a task/procedure on, e.g., a machine that is to be repaired or upgraded. Furthermore, while the expert executes the procedure, the expert may annotate one or more executed steps to explain why certain actions are taken or why certain decisions are made, and such annotations are recorded (step 102). It is to be understood that steps 101 and 102 can be executed in parallel and not necessarily in a sequential order.

The captured sequence of actions and recorded annotations are then converted to an annotated execution trace that represents the execution of the procedure. The execution trace is then stored in a procedure database (step 103). Preferably, multiple execution traces corresponding to the same or similar procedure are generated and stored in the procedure database by different experts (or users) on different machines, for example. Then, to produce an executable procedure for a given procedure, one or more corresponding/related procedure execution traces are retrieved from the procedure database (step 104).

The retrieved execution traces are aligned and generalized to produce an executable procedure. More specifically, an alignment process is performed on the procedure execution traces to identify/match corresponding/related steps/actions between the different procedure traces (step 105). An alignment process according to an embodiment of the invention comprises identifying the control flow of the procedure by determining which steps in each trace correspond to the same logical step in the executable procedure. For example, if one procedure trace consists of two required steps with an optional step in between, and a second procedure trace contains only the two required steps, the alignment process determines that the first steps observed in both traces are instances of the same procedure step, and the last steps observed in both traces are instances of a second procedure step, and the optional step may be present in some executions of the procedure, but not others.

A generalization process is performed using the aligned traces to produce a distributable executable procedure (step 106). A generalization process according to an embodiment of the invention comprises identifying differences between corresponding steps of different traces, explaining them, and abstracting them into a logical description of the action to be performed at each step. Such differences may arise because of variances in the environments in which the traces were generated, such as the username of the expert performing the procedure, or the name of the computer on which the procedure is performed.

Examples of a generalization process according to the invention will now be provided. Consider a scenario in which a communication device, e.g., a wireless card, is installed, and an operating system is instructed to use a specific domain name server ("DNS"). Traces acquired at different locations, such as, on computers having different domain names, have different DNSs. In this example, a generalization process according to the invention would be used for detecting these differences, correlating the differences with the domain name, and inferring a rule to generate the Internet protocol ("IP") address of the DNS from the domain name of the machine.

Another example of generalization comprises identifying branch points in a procedure, where different sub-procedures are executed depending on values of system properties or of user characteristics. The generalization process identifies relevant user properties or user characteristics that determine which sub-procedure is executed.

Yet another example of generalization comprises identifying sequences of steps that are iteratively performed on a collection of objects. In a programming language, this corresponds to a loop. A generalization process according to the invention identifies a collection of objects on which to perform a sequence of steps, the potential differences between the sequences of steps performed on individual objects, and a terminating condition of the loop.

It is to be understood that in another embodiment of the invention, the alignment and generalization steps can be combined into one step, rather than being separately executed.

Once executable procedures are generated and stored, a desired procedure can be retrieved and executed (step 107). In accordance with the invention, the process of retrieving a stored procedure can be performed in a variety of ways. For example, an executable procedure can be delivered to a user via e-mail or on electronic media (e.g., floppy diskette). Furthermore, an executable procedure can be retrieved by a user using a file transfer protocol ("FTP") server, or an executable procedure could be retrieved from a web-server where a search engine facilitates the identification of the correct procedure.

Figure 2:
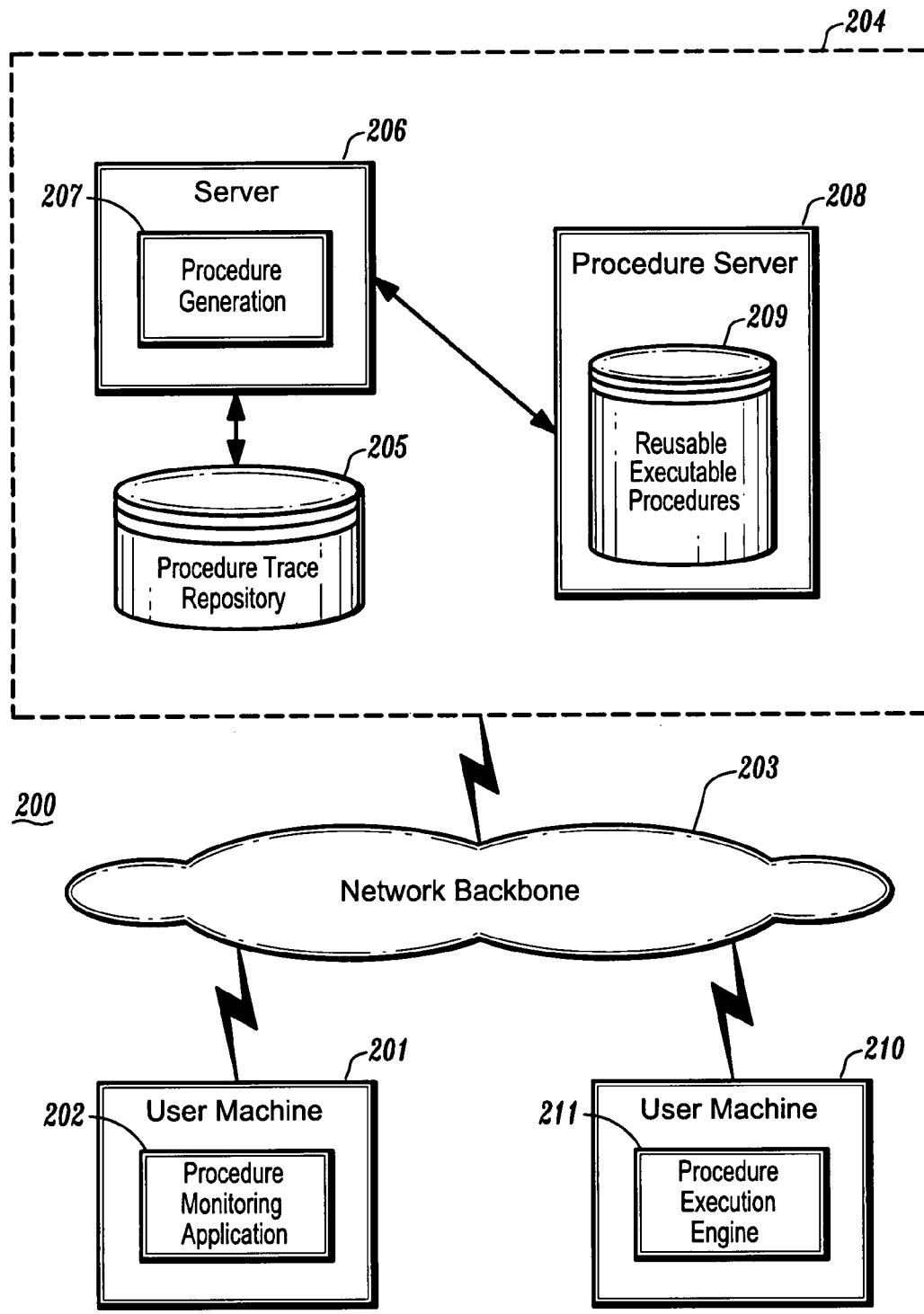
FIG. 2 illustrates a system for generating and distributing executable procedures according to an embodiment of the invention.

Referring now to FIG. 2, a diagram illustrates a system for generating and disseminating executable procedures according to an embodiment of the invention. The system (200) comprises a user machine (201) (e.g., PC (personal computer, laptop computer, etc) comprising a procedure monitoring application (202). The procedure monitoring application (202) is used to monitor and record procedures that are executed and annotated by either an expert or by a user under the direction of an expert during a phone consultation, for example, to create annotated procedure traces. The annotated procedure traces are sent over a network (203) (e.g., Internet, WAN, LAN, wireless, or combination thereof, etc.) to a remote system (204). In one embodiment, the procedure monitoring application (202) performs the steps 101-103 of FIG. 1.

The remote system (204) comprises a procedure trace repository (205) or database which stores annotated procedure traces that are generated via application (202). A server (206) retrieves traces of similar procedure executions from the repository (205) and generates executable procedures via a procedure generation application (207). More specifically, in one embodiment, the procedure generation application (207) aligns and generalizes the traces, and produces distributable executable procedures (steps 104-106, FIG. 1) which are stored in a database (209) of a procedure server (208). The stored reusable, executable procedures (209) can then be distributed across the network (203) to one or more user machines (210) comprising a procedure execution engine (211) for executing such procedures. It is to be understood that the components of system (204) can be distributed over a network (e.g., network (203)).

In a preferred embodiment of the present invention, a procedure monitoring application (202) comprises modules to interface with an operating system (e.g., a version of Microsoft Windows® operating system) to retrieve system information using published application program interfaces ("API") of the operating system, as well as modules that observe the actions of the user, such as mouse movements and keyboard clicks. Methods for monitoring mouse events and keyboard events are known in the art, and can be performed, for example, in the Microsoft Windows® operating system using appropriate system calls. For example, the APIs and system calls for Microsoft Windows® operating systems are described in publicly available documentation.

Preferably, a procedure monitoring application (202) according to the present invention is capable of recording a wide variety of system actions, including visible changes to a graphical user interface ("GUI"), such as, creation and deletion of windows, changes to window contents, and creation, deletion, activation, and deactivation of network connections, for example.

It is to be appreciated that there are various advantages associated with the systems and methods according to the invention. For example, rather than repeatedly guiding multiple users through the same procedure, or writing a complex program (script) that corresponds to the procedure and testing the program on a variety of machines, the present invention enables support center personnel to guide a few users through the procedure, record the procedure execution traces, and then build an executable procedure from such traces. The executable procedure could then be deployed instead of a script. Accordingly, when a user needs to perform a required task, the corresponding executable procedure could be delivered to the user and automatically executed without further intervention of support personnel.

It is to be understood that the number of execution traces that are needed to learn a given procedure will vary based on the complexity of the procedure. For example, a small number of execution traces would be required to learn procedures having limited variability, whereas a potentially large number of traces would be required for complex procedures.

There are various methods for executing executable procedures according to the invention. In general, in one embodiment, an execution method comprises automatically executing an entire executable procedure. In another embodiment of the invention, an execution method comprises automatically executing applicable portions of a procedure, wherein a user or an expert can execute portions of the procedure that have not been learned from previous examples (execution traces). In yet another embodiment, an execution method comprises recording user actions performed during the execution of portions of the procedure that have not been learned from previous examples, and augmenting the procedure by processing the recorded actions.

Figure 3:
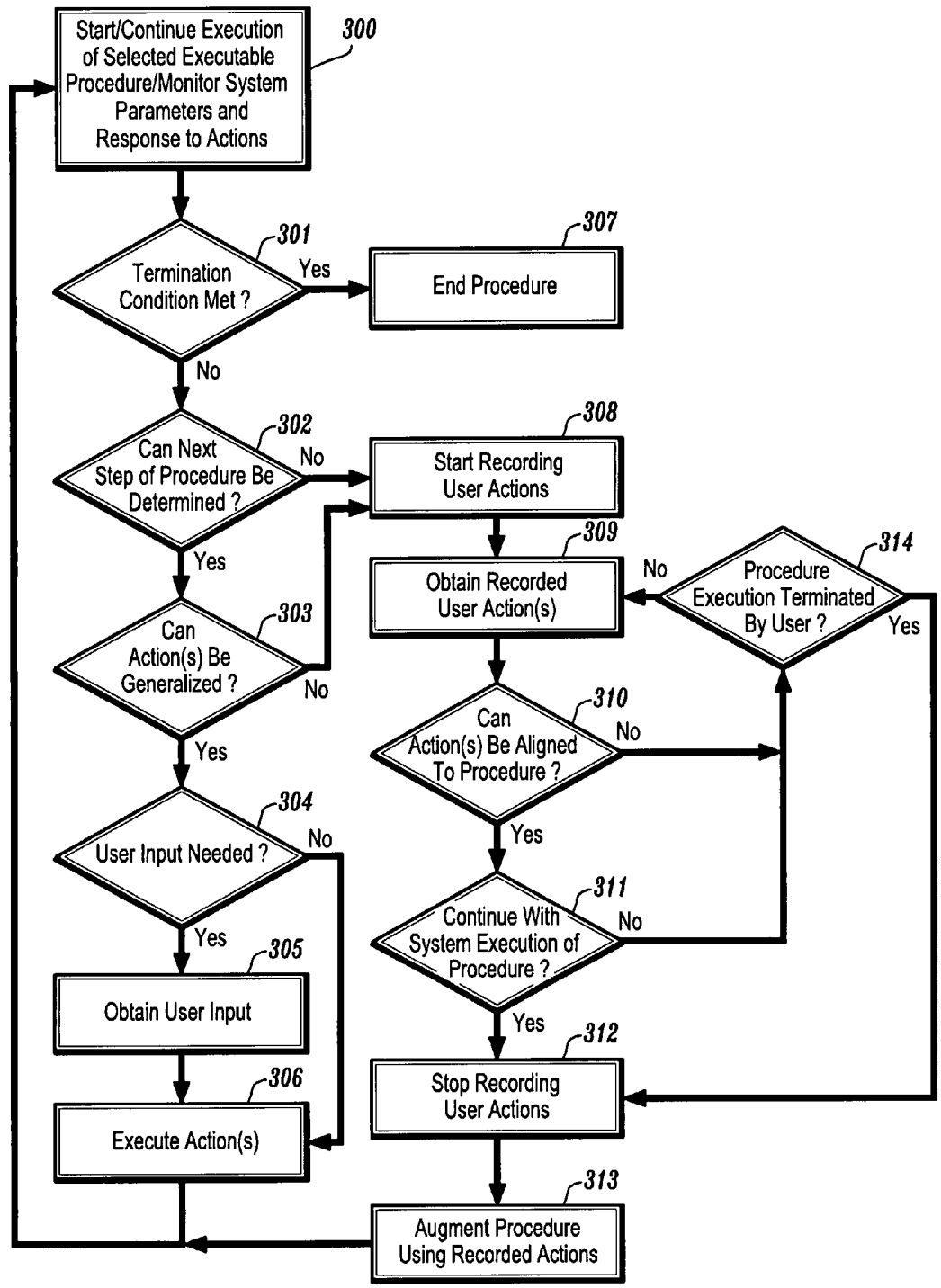
FIG. 3 illustrates a method for executing an executable procedure according to an embodiment of the invention.

FIG. 3 is a flow diagram of a method for executing an executable procedure according to an embodiment of the invention. FIG. 3 illustrates a mode of operation of a procedure execution engine (211, FIG. 2) according to an embodiment of the invention. Initially, a user will obtain/select/retrieve an executable procedure using methods as described above, and the execution engine will commence execution of the selected procedure while monitoring system parameters, user actions and system reactions (step 300). It is to be understood that such monitoring is preferably performed using the same (or similar) procedure monitoring system and method as described above with respect to the procedure monitoring application (202).

Execution of the procedure will continue (i.e., the execution engine will continue to execute the procedure steps) until a termination condition is met (affirmative determination in step 301) in which case the execution engine terminates execution (step 307). On the other hand, when a termination condition is not met (negative determination in step 301), the execution engine will attempt to determine the next procedure step to be executed (step 302).

If execution engine can determine the next step of the procedure that is to be performed (affirmative determination in step 302), the execution engine will attempt to generalize the action(s) associated with the current procedure step (step 303). More specifically, the execution engine will attempt to tailor the action(s) to the specifics of the procedure instance being executed. If the action(s) can be generalized (affirmative determination is step 303), a determination is made as to whether user input is needed for executing the action(s) (step 304).

If no user interaction is required (negative determination in step 304), the execution engine executes the action(s) (step 306), then process flow continues from step 300. If user input (e.g., password) is required (affirmative determination in step 304), then the system asks the user for the desired input (step 305) (e.g., user is prompted for a password), and the action(s) are executed (step 306).

As depicted in the method of FIG. 3, if the currently available procedure is suitable for a specific configuration of the machine/device on which the procedure is executed, and no unforeseen error conditions occur, then the entire procedure is automatically executed until successful termination. In other words, in the exemplary diagram of FIG. 3, only steps 300-306 would be continually executed until a termination condition is met (step 301).

However, if the execution system fails to identify which procedure step should be executed next (negative determination in step 302), or fails to generalize (negative determination in step 303), then the system temporarily relinquishes the procedure execution to the user for manual execution, whereby the process flow continues from step 308.

More specifically, there may be unforeseen conditions that occur, in which the execution engine is unable to determine the next step of the procedure to be executed (negative determination in step 302). For instance, the previous action may have resulted in an error condition for which no recovery procedure had been recorded.

Moreover, there may be circumstances in which the execution engine is unable to generalize (negative determination in step 303). For example, assume that the execution engine determines that it must launch a specific application. The execution engine will look for the application in a set of directories learned from the execution traces used for learning the procedure. Presuming that the application has been installed in an unusual directory and that the engine is not able to find the application, then the execution engine fails to generalize.

When the system temporarily relinquishes the procedure execution to the user, the execution system starts recording system parameters, user actions, and system reactions (step 308) that have been monitored starting from step 300. As the user executes actions, the execution system obtains recorded action(s) (step 309) and attempts, in real-time, to align the user actions with the procedure (step 310).

If the execution system determines that the current user action(s) cannot be aligned with the procedure (negative determination in step 310), the system will continue to obtain recorded user actions (step 309) and attempt alignment (step 311). As the process of real-time alignment of user actions with the procedure continuously fails, the execution system will continue to record the user actions until the user terminates the sub-procedure execution (affirmative determination in step 314).

If the execution system determines that the current user action(s) can be aligned with the procedure (affirmative determination in step 310), the execution system queries the user as to whether the system should take control of the execution (step 311). If the user does not relinquish control of the procedure execution to the system (negative result in step 311), the system will continue to record and process the user actions. On the other hand, if the user allows the execution system to regain control of the procedure execution (affirmative result in step 311), the system will stop recording the user actions (312).

The recorded actions will then be processed to augment the learned procedure (step 313) so that the same situation encountered during future invocations of the procedure results in a normal procedure execution. In one embodiment of the invention, step 313 is performed by sending the recorded user actions to the procedure repository (205), whereby the recorded user actions are processed by the server (206) to update the executable procedure stored in database (209) of the procedure server (208), as shown in FIG. 2.

In one preferred embodiment according to the present invention, when an executable procedure is performed in a GUI (graphical user interface)-based system, such as the Microsoft Windows® operating systems or a Java® virtual machine, the executed actions (step 306, FIG. 3) are performed by simulating user actions such as, mouse and keyboard clicks. This can be done by invoking the appropriate API of the GUI, for example, APIs described in Microsoft Development Network ("MSDN") on-line resources.

Advantageously, the method of FIG. 3 enables executable procedures to be learned from examples incrementally. Initially, executable procedures that are learned from a handful of examples (execution traces) can be distributed and widely executed. Indeed, paths through a procedure that apply to large number of users can be quickly learned, and then disseminated to a large portion of the user base, which users can readily benefit from the learned procedure. Then, when new paths (new sub-procedure) of the procedure are subsequently encountered, systems and methods according to the present invention (e.g., the method of FIG. 3) can be implemented to enable a user to manually perform the new sub-procedure. The manually entered sub-procedure results in execution traces that can be used for learning/augmenting/updating an executable procedure, and incorporated in the executable procedure.

The execution of a new sub-procedure may include calling a support center, but the length of such call would generally be shortened/reduced (as compared to conventional methods), because the execution system could regain control of the procedure execution after the sub-procedure terminates, and then automatically execute known (learned) actions. Moreover, an updated, executable procedure can be reused by other users. Therefore, the number and length of calls to the service center to solve the same problem is substantially reduced using the systems and methods described herein.

Moreover, as the computing environment evolves and new software or hardware components become available, a learned executable procedure is not rendered obsolete. For example, when a user having a computer with more recent components attempts to execute a given executable procedure, the execution engine may detect an unusual situation (steps 302 or 303, FIG. 3) during execution of the executable procedure. In such circumstances, the user can enter a new portion of the executable procedure either with or without the assistance of the support center, whereby the executable procedure can be updated and made available to future users.

Figure 4:
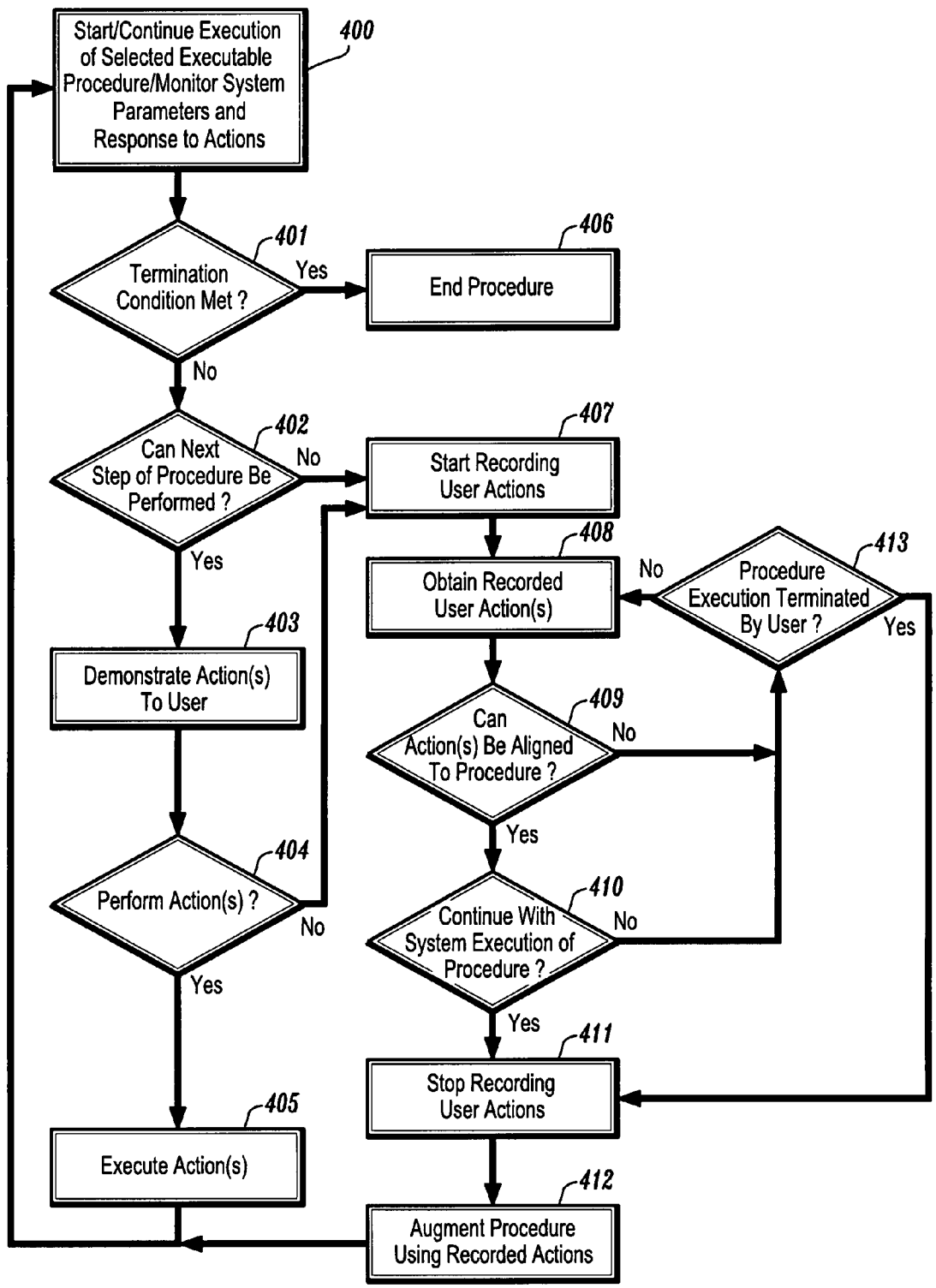
FIG. 4 illustrates a method for executing an executable procedure according to another embodiment of the invention.

FIG. 4 is a flow diagram of a method for executing an executable procedure according to another embodiment of the invention. FIG. 4 illustrates a mode of operation of a procedure execution engine (211, FIG. 2) according to another embodiment of the invention. In general, the method of FIG. 4 is similar to the method of FIG. 3, but extends such method by enabling execution of a learned procedure under direct supervision of the user.

More specifically, referring now to FIG. 4, a user will obtain/select/retrieve an executable procedure, and the execution engine will commence execution of the selected procedure while monitoring system parameters, user actions and system reactions (step 400). Execution of the procedure will continue until a termination condition is met (affirmative determination in step 401) in which case the execution engine terminates execution (step 407). It is to be understood that steps 400, 401 and 406 are essentially the same as steps 300, 301 and 307, respectively, of FIG. 3.

On the other hand, when a termination condition is not met (negative determination in step 401), the execution engine will attempt to determine if the next step of the executable procedure can be performed (step 402). In one embodiment of the invention, this process (step 402) includes identifying the next step of the procedure that is to be performed and attempting to generalize the action(s) associated with the next procedure step. In other words, in one embodiment, step 402 is essentially the same as steps 302 and 303 of FIG. 3 combined.

If the next step of the procedure can be performed (affirmative determination in step 402), the execution engine will demonstrate (or otherwise indicate) to the user the next action to be performed (step 403). For example, in one embodiment where the execution system supports a GUI, the execution engine can interact with GUI widgets, for example, windows, menus, and buttons, to thereby indicate the next step of a procedure to the user by outlining, highlighting, or pointing to the window where the action is to be taken and textually explaining the action, for example, "select an item", "type the following sentence", "clicking the button", and displaying expert annotations, if available.

The execution engine will then determine if the user has authorized the execution engine to perform such demonstrated/specified action (step 404). If the user authorizes the next step to be performed (affirmative determination in step 404), the specified action will be performed (step 405). Otherwise, if authorization is not given (negative determination in step 404), the user can commence with manual execution (proceed to step 407) as explained above with reference to FIG. 3.

It is to be appreciated that authorization from the user (step 404) can be obtained explicitly or implicitly. In one embodiment where explicit authorization is provided, the user interface can display a "next step" button, for example, that enables the user to click or otherwise select the button to proceed with execution (step 405). Furthermore, any user input required to perform the action (e.g., password) may be included in such authorization.

On the other hand, the system can be configured such that the user can provide implicit direction to not execute the specified action, e.g., by the user performing another action, whereby execution proceeds to step 407. In yet another embodiment according to the present invention, the user interface can include a "pause" button, which temporarily pauses the procedure execution, thereby allowing the user to perform unrelated tasks in the interim.

It is be appreciated that as with the method of FIG. 3 explained above, the method of FIG. 4 allows a user to manually perform and record a portion of the executable procedure (in other words, steps 407, 408, 409, 410, 411 and 413 of FIG. 4 are essentially the same as steps 308, 309, 310, 311, 312, and 314, respectively, of FIG. 3). In addition, as with the method of FIG. 3, the method of FIG. 4 allows incremental augmentation of the learned executable procedure from execution traces that are obtained during manual execution of a portion of an executable procedure (that is, steps 412 and 313 are essentially the same), even when no unforeseen events are detected and the next step of the procedure can be performed (affirmative determination in step 402). In other words, if an action can be performed and is demonstrated to the user, the user can still direct the system to not execute the action (negative result in step 404) and proceed manually (proceed to steps 408, et seq.).

It is to be appreciated that the capability of allowing a user to manually perform a new sub-procedure or manually perform already learned steps of an executable procedure (according to the methods of FIGS. 3 and 4) is not supported by conventional methods that use scripts. The methods and systems described herein support such capabilities because actions performed by the user are aligned with the learned procedure. When alignment is achieved, the execution engine can again take over the procedure and continue to correctly execute it. Conventional scripts or programs are not able to monitor user actions and recognize when they can resume operation. These functionalities must be programmed and tailored to individual procedures.

It is to be further appreciated that in another embodiment of the invention, the method of FIG. 4 can be extended such that various steps in the process (e.g., steps 402, 403, 404) are performed with other user interactions. For example, when implementing the method of FIG. 4, when the execution system is faced with a situation where it is determined (in step 402) that multiple alternative actions can be taken and the system cannot determine which action to select(negative determination in step 402), rather than proceed to step 407, the system can be configured to inform the user that there are multiple possible actions, and demonstrate one or more possible actions to the user (step 403). For example, the system could list the actions textually, and allow the user to select which actions should be demonstrated. In this embodiment, the user would be allowed to select one of the multiple alternatives or to reject them all.

In yet another embodiment, if the execution system is faced with multiple alternative actions, the system could be configured to rank such actions in the order of importance, display these actions in the ranked order, and provide the user with a justification of the ranking. For example, in a circumstance where most of the previously recorded traces perform a particular action, while a minority of the previously traces contain one or more different actions, the execution system could rank the particular action as the most important, and justify the ranking in terms of frequency of occurrence in previously recorded traces.

It is to be appreciated that in addition to systems and methods for executing procedures learned from examples, other embodiments of the invention may be readily envisioned by those of ordinary skill in the art based on the teachings herein. For example, in the system (200) depicted in FIG. 2, the procedure generation module (207) in server (206) may comprise visualization and editing tools that would enable an expert to visualize and edit an executable procedure. A visualization tool preferably comprises those mechanisms described above (e.g., GUI simulation of procedure execution). A procedure editing tool preferably enables, for example, adding and removing procedure steps or sub-procedures, adding and removing conditions that distinguish between sub-procedures, adding and removing annotations, or merging different procedure steps or sub-procedures.

In another embodiment of the invention, some of the stored procedures (209) in the procedure server (208) can be directly constructed using a procedure editor tool, which allows an expert to construct procedures by demonstrating or coding individual steps, specifying preconditions and post-conditions of individual steps by demonstration or by manual coding, and combining multiple individual steps using the editing capabilities described above.

Although illustrative embodiments have been described herein with reference to the accompanying drawings, it is to be understood that the invention is not limited to the precise system and method embodiments described herein, and that various other changes and modifications may be affected therein by one or ordinary skill in the art without departing form the scope or spirit of the invention. All such changes and modifications are intended to be included within the scope of the invention as defined by the appended claims.

What is claimed is:

1. A method for automatically repairing or upgrading a computer, comprising:
monitoring and recording mouse and keyboard input of a plurality of different expert users manually repairing or upgrading a plurality of different computers;
storing the recorded mouse and keyboard input of the plurality of different expert users working on the plurality of different computers in a trace repository;
aligning corresponding steps of the recorded mouse and keyboard input of the plurality of different expert users working on the plurality of different computers stored in the trace repository, wherein aligning the corresponding steps includes identifying and matching corresponding or related steps or actions between different procedural traces from the plurality of different experts working on the plurality of different computers stored in the trace repository;
generalizing the aligned recorded mouse and keyboard input of the plurality of expert users working on the plurality of different computers and generating an executable procedure therefrom;
distributing the generated executable procedure to one or more client computer devices; and
executing the distributed executable procedure on the one or more client computer devices to automatically repair or upgrade the one or more client computer devices,
wherein generalizing the aligned recorded mouse and keyboard input of the plurality of expert users and generating an executable procedure therefrom includes:
identifying differences between corresponding steps;
explaining each of the identified differences; and
abstracting each of the identified differences into a logical description of the aligned recorded mouse and keyboard input of the plurality of expert users.

2. The method of claim 1, wherein the plurality of expert users additionally annotate the recordings of the mouse and keyboard input to explain why certain actions are taken or why certain decisions are made.

3. The method of claim 1, wherein aligning the corresponding steps of the recorded mouse and keyboard input of the plurality of expert users stored in the trace repository includes identifying a control flow of the repairing or upgrading of the computer by determining which recorded inputs of each repairing or upgrading correspond to same logical steps.

4. The method of claim 1, wherein the generated executable procedure is automatically executed in its entirety on the one or more client computer devices without further manual intervention.

5. The method of claim 1, wherein executing the distributed executable procedure on the one or more client computer devices to automatically repair or upgrade the one or more client computer devices includes automatically executing applicable portions of the distributed executable procedure and then permitting a user to manually perform aspects of the repair or upgrade that are not applicable to the distributed executable procedure.

6. The method of claim 5, wherein as the user manually performs aspects of the repair or upgrade that are not applicable to the distributed executable procedure, mouse and keyboard inputs thereof are monitored and recorded, stored in the trace repository, aligned, generalized and added to the executable procedure.

7. The method of claim 5, wherein after the user manually performs aspects of the repair or upgrade that are not applicable to the distributed executable procedure, the user is queried as to whether to resume automatic repair or upgrade and where the user responds to the query affirmatively, automatic repair or upgrade is resumed.

8. A system for automatically repairing or upgrading a computer, comprising:
a plurality of different computers for monitoring and recording mouse and keyboard input of a plurality of different expert users manually repairing or upgrading a computer;
a trace repository for storing the recorded mouse and keyboard input of the plurality of different expert users working on the plurality of different computers;
a server for aligning corresponding steps of the recorded mouse and keyboard input of the plurality of different expert users stored in the trace repository and generalizing the aligned recorded mouse and keyboard input of the plurality of different expert users working on the plurality of different computers and generating an executable procedure therefrom, wherein aligning the corresponding steps includes identifying and matching corresponding or related steps or actions between different procedural traces from the plurality of different experts working on the plurality of different computers stored in the trace repository; and
one or more client computer devices for executing the distributed executable procedure to automatically repair or upgrade the one or more client computer devices,
wherein generalizing the aligned recorded mouse and keyboard input of the plurality of expert users and generating an executable procedure therefrom includes:
identifying differences between corresponding steps;
explaining each of the identified differences; and
abstracting each of the identified differences into a logical description of the aligned recorded mouse and keyboard input of the plurality of expert users.

9. The system of claim 8, wherein the plurality of expert users additionally annotate the recordings of the mouse and keyboard input to explain why certain actions are taken or why certain decisions are made.

10. The system of claim 9, wherein aligning the corresponding steps of the recorded mouse and keyboard input of the plurality of expert users stored in the trace repository includes identifying a control flow of the repairing or upgrading of the computer by determining which recorded inputs of each repairing or upgrading correspond to same logical steps.

11. The system of claim 9, wherein the generated executable procedure is automatically executed in its entirety on the one or more client computer devices without further manual intervention.

12. The system of claim 9, wherein executing the distributed executable procedure on the one or more client computer devices to automatically repair or upgrade the one or more client computer devices includes automatically executing applicable portions of the distributed executable procedure and then permitting a user to manually perform aspects of the repair or upgrade that are not applicable to the distributed executable procedure.

13. The system of claim 12, wherein as the user manually performs aspects of the repair or upgrade that are not applicable to the distributed executable procedure, mouse and keyboard inputs thereof are monitored and recorded, stored in the trace repository, aligned, generalized and added to the executable procedure.

14. The system of claim 12, wherein after the user manually performs aspects of the repair or upgrade that are not applicable to the distributed executable procedure, the user is queried as to whether to resume automatic repair or upgrade and where the user responds to the query affirmatively, automatic repair or upgrade is resumed.

\* \* \* \* \*